United States Patent
Sylvester

(10) Patent No.: US 10,663,089 B2
(45) Date of Patent: May 26, 2020

(54) UNIVERSAL CABLE TIE MOUNT

(71) Applicant: Panduit Corp., Tinley Park, IL (US)

(72) Inventor: David J. Sylvester, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/174,511

(22) Filed: Oct. 30, 2018

(65) Prior Publication Data

US 2019/0137011 A1     May 9, 2019

Related U.S. Application Data

(60) Provisional application No. 62/581,283, filed on Nov. 3, 2017.

(51) Int. Cl.
| | |
|---|---|
| F16L 3/22 | (2006.01) |
| H02G 3/32 | (2006.01) |
| F16L 3/137 | (2006.01) |
| F16L 3/233 | (2006.01) |

(52) U.S. Cl.
CPC ............... *F16L 3/221* (2013.01); *F16L 3/137* (2013.01); *F16L 3/233* (2013.01); *H02G 3/32* (2013.01)

(58) Field of Classification Search
CPC ....................................................... F16L 3/221
USPC .... 248/65, 67.7, 68.1, 69, 70, 71, 74.1, 74.3
See application file for complete search history.

(56) References Cited

U.S. PATENT DOCUMENTS

| | | | |
|---|---|---|---|
| 2,884,214 A | 4/1959 | Wrobel | |
| 2,915,268 A | 12/1959 | Wrobel | |
| 3,100,922 A | 8/1963 | Burniston | |
| 3,486,725 A | 12/1969 | Hidassy | |
| 3,550,219 A | 12/1970 | Van Buren, Jr. | |
| 3,632,071 A | 1/1972 | Cameron et al. | |
| 3,900,922 A | 8/1975 | McCormick | |
| 4,269,379 A | 5/1981 | McCormick | |
| 4,557,023 A | 12/1985 | Six et al. | |
| 4,562,982 A | 1/1986 | McSherry et al. | |
| 4,602,760 A | 7/1986 | Tiefenbach et al. | |
| 4,717,100 A * | 1/1988 | Klein | F16B 21/086 248/73 |
| 4,768,741 A | 9/1988 | Logsdon | |
| 4,925,136 A | 5/1990 | Knott | |
| 4,999,019 A * | 3/1991 | Kraus | F16B 37/0842 24/297 |
| 5,035,383 A * | 7/1991 | Rainville | H02G 3/26 248/68.1 |

(Continued)

FOREIGN PATENT DOCUMENTS

| | | |
|---|---|---|
| EP | 2371046 B1 | 1/2018 |
| GB | 933929 | 8/1963 |

*Primary Examiner* — Terrell L McKinnon
*Assistant Examiner* — Michael McDuffie
(74) *Attorney, Agent, or Firm* — Christopher S. Clancy; James H. Williams; Aimee E. McVady

(57) ABSTRACT

A cable tie mount that provides multiple mounting options and accommodates a plurality of cable bundle positions. The cable tie mount includes a body having a first side, a second side, a first end, a second end, a top surface, and a bottom surface opposite the top surface. The top surface includes a top center opening defined by top inner walls. The bottom surface includes a bottom center opening defined by bottom inner walls. The cable tie mount also includes a center hole extending through the body from the top center opening in the top surface to the bottom center opening in the bottom surface.

13 Claims, 16 Drawing Sheets

(56) References Cited

U.S. PATENT DOCUMENTS

| | | | |
|---|---|---|---|
| 5,332,179 A | 7/1994 | Kuffel et al. | |
| 5,386,615 A | 2/1995 | Bernard | |
| 5,653,409 A | 8/1997 | White, Jr. et al. | |
| 5,730,399 A | 3/1998 | Baginski | |
| 5,820,083 A | 10/1998 | Geiger | |
| 5,954,302 A | 9/1999 | Robertson et al. | |
| 5,966,781 A | 10/1999 | Geiger | |
| 6,196,751 B1 | 3/2001 | Khokhar | |
| 6,240,602 B1 | 6/2001 | Geiger | |
| 6,364,257 B1 | 4/2002 | Holder | |
| 6,533,226 B2 | 3/2003 | Geiger | |
| 6,880,788 B2 * | 4/2005 | Stephen | F16B 35/041 174/53 |
| 6,899,304 B2 | 5/2005 | Bellmore et al. | |
| 7,267,307 B2 * | 9/2007 | Bauer | F16L 3/223 248/65 |
| D570,673 S | 6/2008 | Geiger et al. | |
| 7,614,589 B2 * | 11/2009 | Kato | F16L 3/223 248/55 |
| 7,686,259 B2 * | 3/2010 | Caveney | B60R 16/0215 211/85.5 |
| 7,726,922 B2 * | 6/2010 | Slyter | F16B 5/0685 24/297 |
| 7,770,852 B2 * | 8/2010 | Caveney | F16B 5/0685 248/68.1 |
| 7,861,981 B2 | 1/2011 | Olver | |
| 8,020,811 B2 * | 9/2011 | Nelson | F16L 3/2235 174/68.1 |
| 8,829,353 B2 * | 9/2014 | Homner | H01B 17/14 174/158 R |
| 8,894,022 B2 * | 11/2014 | Chirpich | F16L 3/137 248/228.8 |
| 9,067,717 B2 * | 6/2015 | DeMik | B65D 67/02 |
| D734,654 S | 7/2015 | Geiger | |
| D760,067 S | 6/2016 | Geiger | |
| 9,689,511 B1 | 6/2017 | Thornton | |
| 10,096,934 B1 * | 10/2018 | Desjardins | H02G 3/32 |
| 2004/0021042 A1 * | 2/2004 | Stephen | F16B 35/06 248/68.1 |
| 2011/0114802 A1 * | 5/2011 | Hjerpe | F16L 3/222 248/68.1 |
| 2011/0303799 A1 * | 12/2011 | Blanchard | B64C 1/406 248/65 |
| 2013/0068899 A1 | 3/2013 | Richter | |
| 2013/0156527 A1 * | 6/2013 | Hutchinson | F16B 33/00 411/368 |
| 2015/0102181 A1 * | 4/2015 | Hook | F16M 13/02 248/68.1 |
| 2015/0214702 A1 * | 7/2015 | Langlade | B64C 1/406 248/68.1 |

\* cited by examiner

UNIVERSAL CABLE TIE MOUNT

This application claims priority to U.S. Provisional Application No. 62/581,283, filed Nov. 3, 2017, the subject matter of which is hereby incorporated by reference in its entirety.

FIELD OF THE INVENTION

The present invention relates to a cable tie mount, and more particularly to a cable tie mount with multiple mounting options to accommodate various bundle positions.

BACKGROUND OF THE INVENTION

U.S. Pat. No. 3,632,071 discloses a typical mount secured to a surface that receives a strap to secure a bundle. The mount includes a base and a separate saddle. The saddle is a separate piece and has a passage therethrough with openings for receiving a strap. A bundle is positioned on the saddle and secured to the mount.

Although the prior art mount enables a bundle to be secured to a surface, the typical mounts are limited in mounting options for the bundle. Thus, it would be desirable to provide a mount that may be secured to a surface via various fasteners. It would also be desirable to provide a mount that enables a bundle to be secured in various bundle positions.

SUMMARY OF THE INVENTION

A cable tie mount that may be secured to a surface by a number of mounting options and accommodates cable bundles secured in a number of positions. The cable tie mount includes a body having a first side, a second side, a first end, a second end, a top surface, and a bottom surface opposite the top surface. The top surface includes a top center opening defined by top inner walls. The bottom surface includes a bottom center opening defined by bottom inner walls. The cable tie mount also includes a center hole that extends through the body from the top center opening in the top surface to the bottom center opening in the bottom surface.

DETAILED DESCRIPTION

Figure 1:
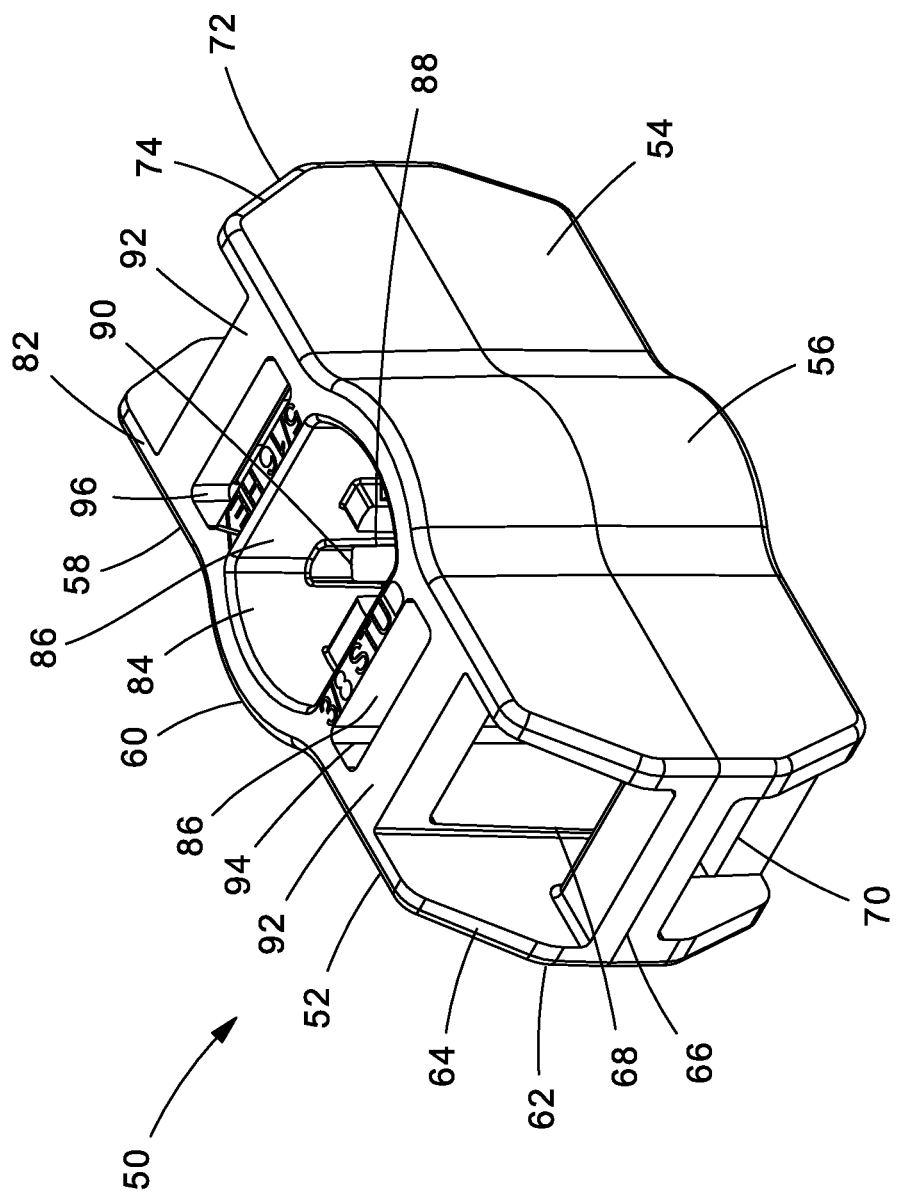
FIG. 1 is a left perspective top view of the cable tie mount of the present invention.

FIGS. 1-16 illustrate the universal cable tie mount 50 of the present invention. As illustrated and discussed below, the cable tie mount 50 provides multiple mounting options to accommodate various bundle positions. The cable tie mount 50 accepts various cable tie sizes to secure the bundles. As a result, the single cable tie mount 50 reduces inventory thereby easing installation with one part accommodating various bundles and cable ties.

The cable tie mount 50 includes a body 52 with a first side 54, an identical second side 58, a first end 62, and an identical second end 72. The first and second ends 62, 72 include angled surfaces 64, 74, respectively, for enabling bundles to be mounted at an angle with respect to the cable tie mount 50. Each side 54, 58 of the cable tie mount 50 includes a curved center surface 56, 60, respectively.

The cable tie mount 50 also includes a flat top 82 and a flat bottom 98. The cable tie mount 50 includes top and bottom center openings 84, 100 with a hole 88 extending through the center of the mount. The hole 88 is defined by a plurality of interference wedges 90. The interference wedges 90 provide an interference fit when the cable tie mount 50 is positioned on a ⅜" stud 106. The interference wedges 90 engage the threads on the ⅜" stud 106 to the affix the cable tie mount 50 (see FIGS. 5 and 6). The interferences wedges 90 are positioned within the center hole 88 such that the interference wedges 90 engage the stud 106 when the stud 106 is inserted from the top or bottom of the cable tie mount 50.

Figure 2:
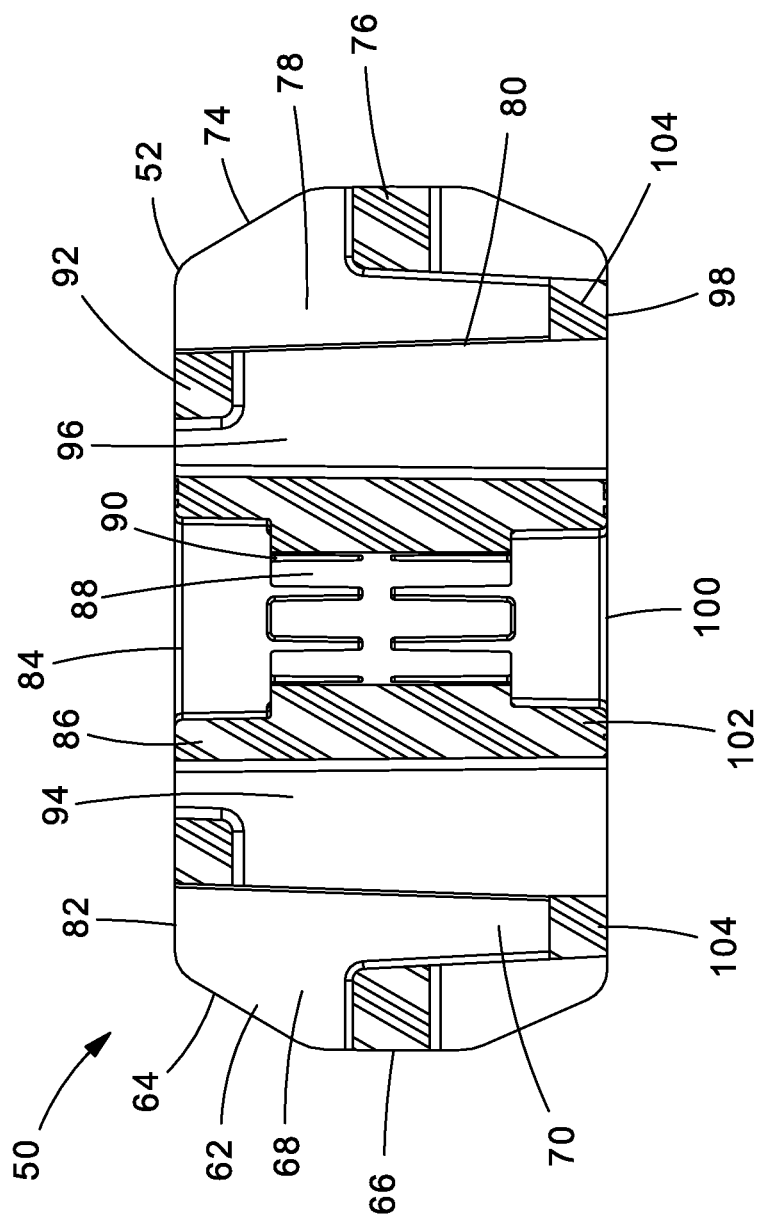
FIG. 2 is a cross sectional view of the cable tie mount of FIG. 1.

As illustrated in FIGS. 1 and 2, the top 82 of the cable tie mount 50 is also designed to receive a 5/16" hex bolt 108 to affix the mount 50 to a surface 120. The top center opening 84 is defined by inner walls 86 and is sized to retain the head 110 of the 5/16" hex bolt 108. The inner walls 86 of the center opening 84 act as anti-rotation walls to prevent the head 110 of the hex nut bolt 108 from being rotated when securing the nut 112 to the bolt 108 (see FIGS. 9 and 10).

Figure 3:
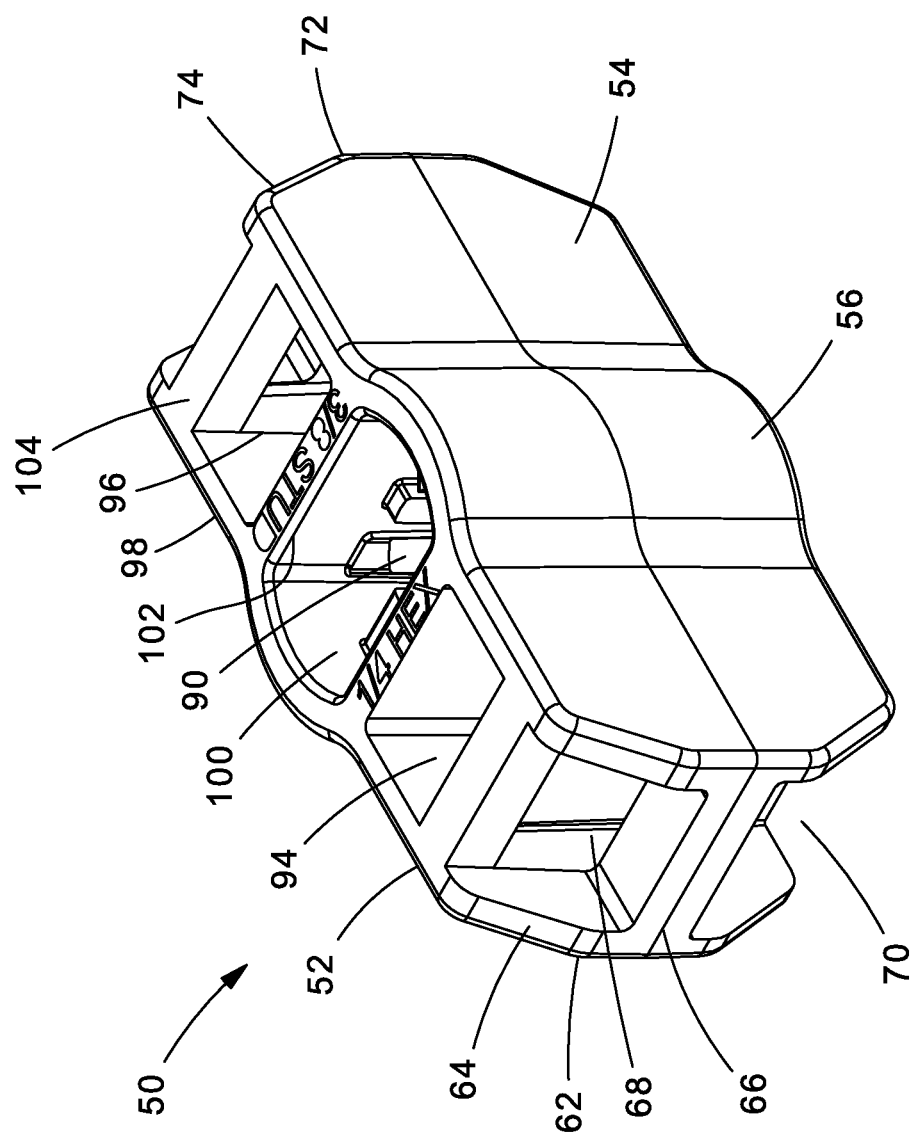
FIG. 3 is a left perspective bottom view of the cable tie mount of FIG. 1.
Figure 4:
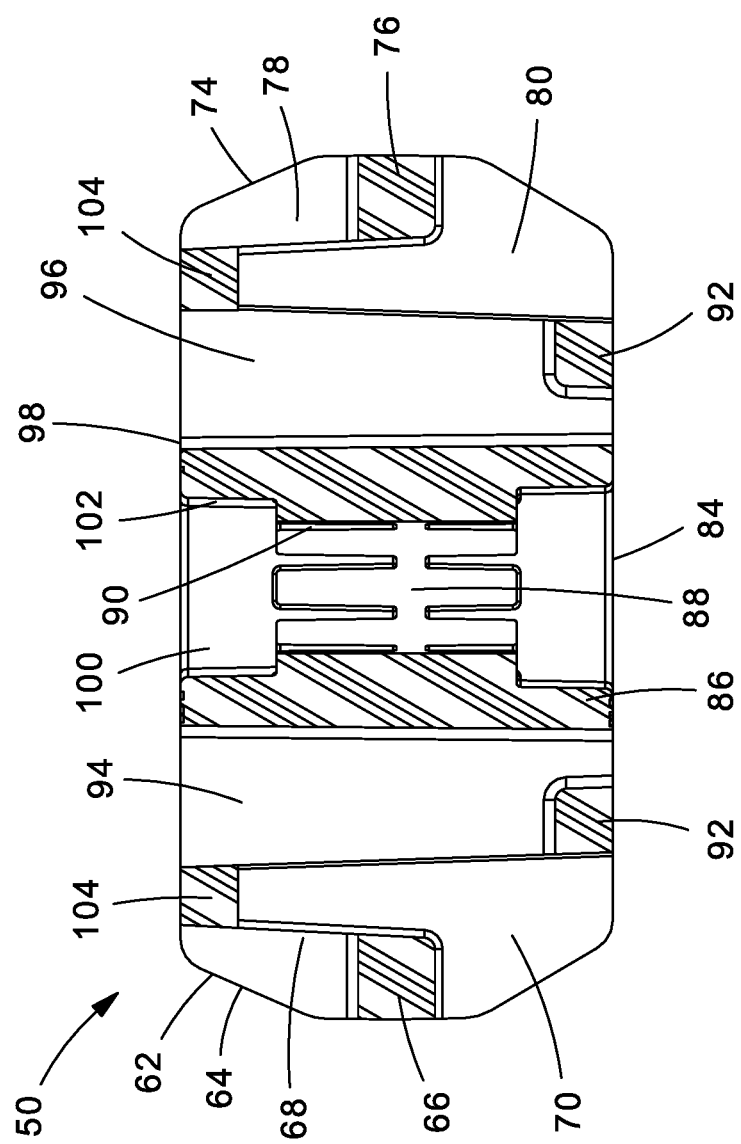
FIG. 4 is a cross sectional view of the cable tie mount of FIG. 3.

As illustrated in FIGS. 3 and 4, the bottom 98 of the cable tie mount 50 is also designed to receive a ¼" hex bolt 114. The bottom center opening 100 is defined by inner walls 102 and is sized to retain the head 116 of the ¼" hex bolt 114. The inner walls 102 of the center opening 100 act as anti-rotation walls to prevent the head 116 of the hex nut bolt 114 from being rotated when securing the nut 118 to the bolt 114 (see FIGS. 7 and 8).

The distance between the top inner walls 86 is greater than the distance between the bottom inner walls 102 enabling the top center opening 84 to accommodate a larger fastener than the bottom center opening 100.

The cable tie mount 50 includes a plurality of bundle retainer ribs. The bundle retainer ribs define a plurality of strap passageways in the cable tie mount. The strap passageways receive cable ties of various thickness, as required, to secure various sized bundles. As illustrated in FIGS. 1 and 2, the top 82 of the cable tie mount 50 includes top bundle retainer ribs 92. The top bundle retainer ribs 92 and the inner walls 86 define a first strap passageway 94 and a second strap passageway 96 that run from the top 82 to the bottom 98 of the cable tie mount 50.

As illustrated in FIGS. 3 and 4, the bottom 98 of the cable tie mount 50 includes bottom bundle retainer ribs 104. The bottom bundle retainer ribs 104 are positioned closer to the first end 62 and the second end 72 then the inner walls 102 at the center of the cable tie mount 50.

The first end 62 and the second end 72 of the cable tie mount 50 include end bundle retainer ribs 66, 76, respectively. The first end bundle retainer rib 66 defines a third strap passageway 68 and a fourth strap passageway 70 in the cable tie mount 50. The second end bundle retainer rib 76 defines a fifth strap passageway 78 and a sixth strap passageway 80 in the cable tie mount 50. As discussed below, cable ties or straps 130 are installed in the various strap passageways to secure a bundle 140 to the cable tie mount 50. The location of the cable tie or strap is based on the desired location and the size of the bundle.

Figure 5:
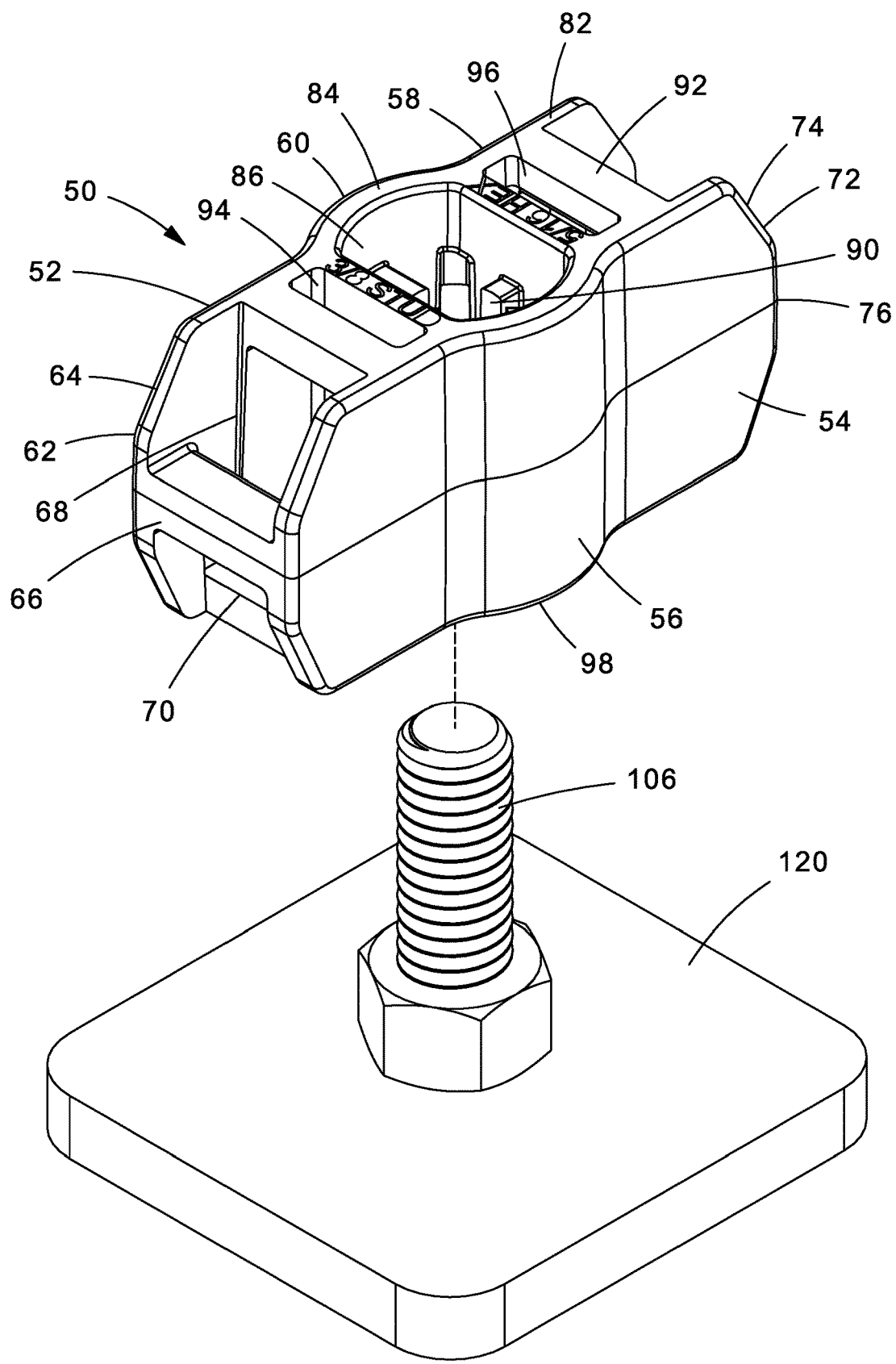
FIG. 5 is a perspective view of the cable tie mount of FIG. 1 positioned to be mounted on a stud.
Figure 6:
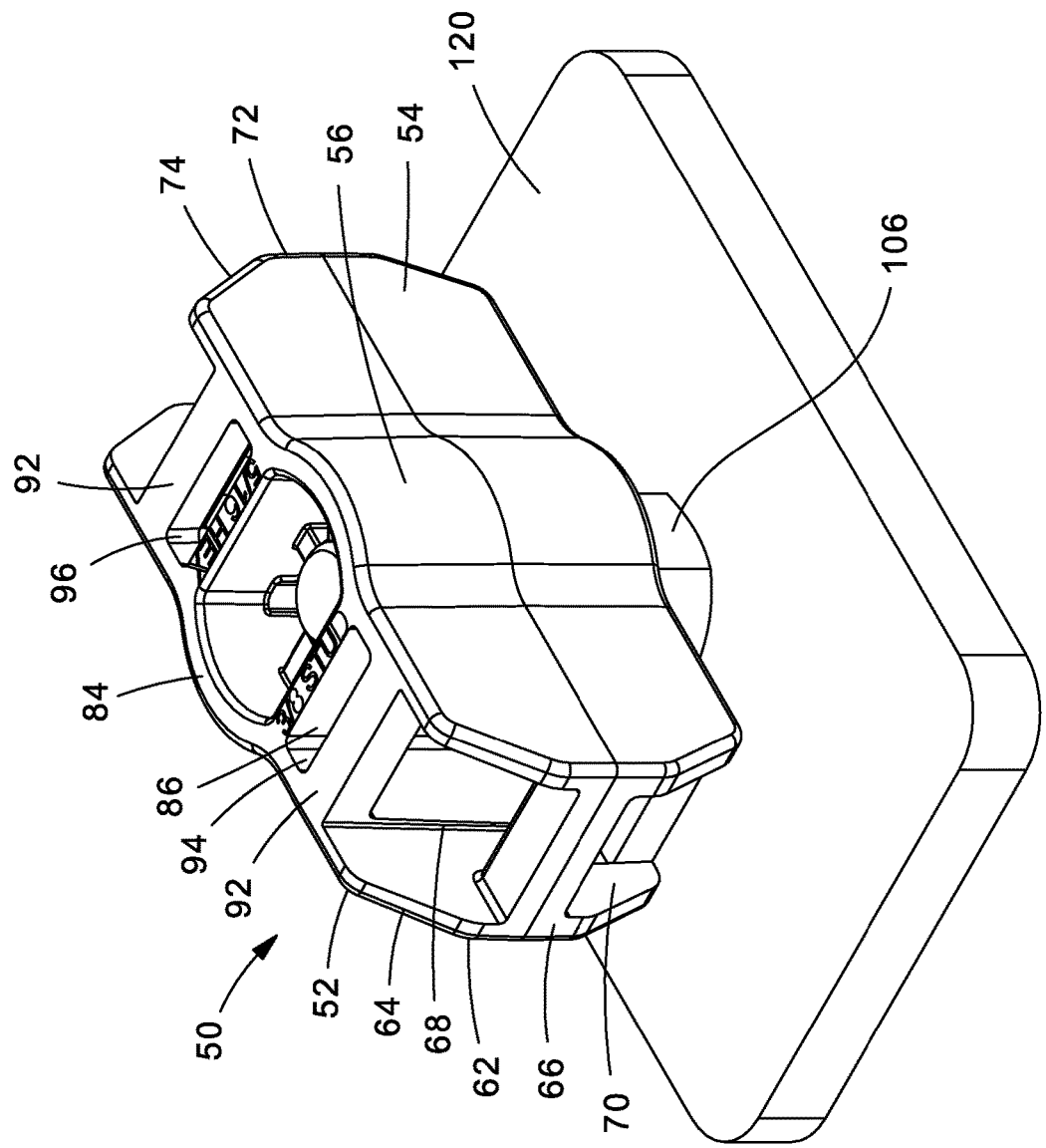
FIG. 6 is a perspective view of the cable tie mount of FIG. 5 mounted on the stud.

FIGS. 3-8 illustrate the cable tie mount 50 secured to a stud 106 or hex bolts 108, 114. FIGS. 5 and 6 illustrate the cable tie mount 50 secured to a stud 106. As discussed above, the top and bottom center openings 84, 100, respectively, are designed to receive the stud 106 and the interference wedges 90 maintain the cable tie mount 50 on the stud 106. Although FIGS. 5 and 6 illustrate the bottom center opening 100 receiving the stud 106, the cable tie mount 50 may be turned over so the top center opening 84 receives the stud 106.

Figure 7:
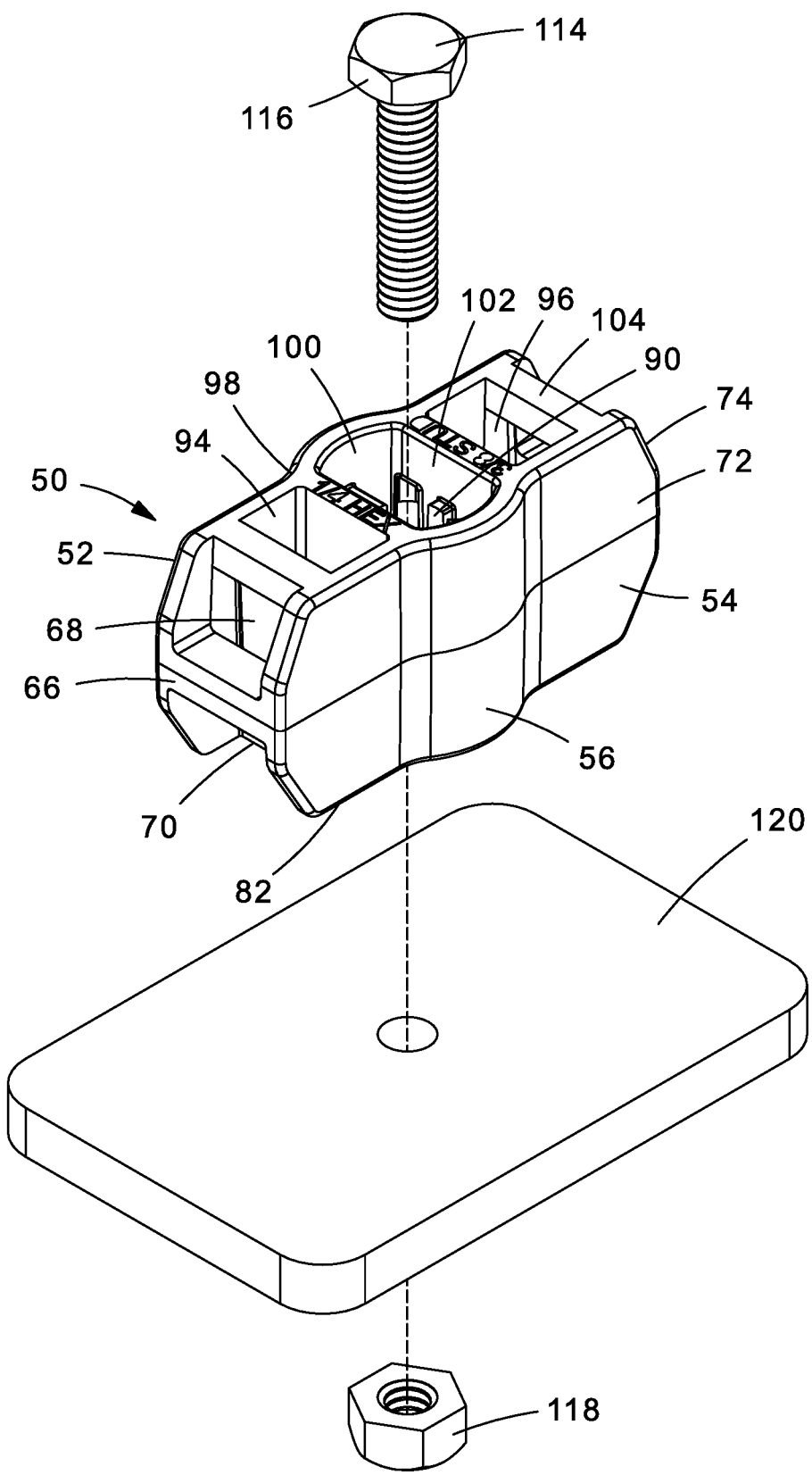
FIG. 7 is a perspective view of the cable tie mount of FIG. 3 positioned to be mounted to a surface via a ¼" hex bolt.
Figure 8:
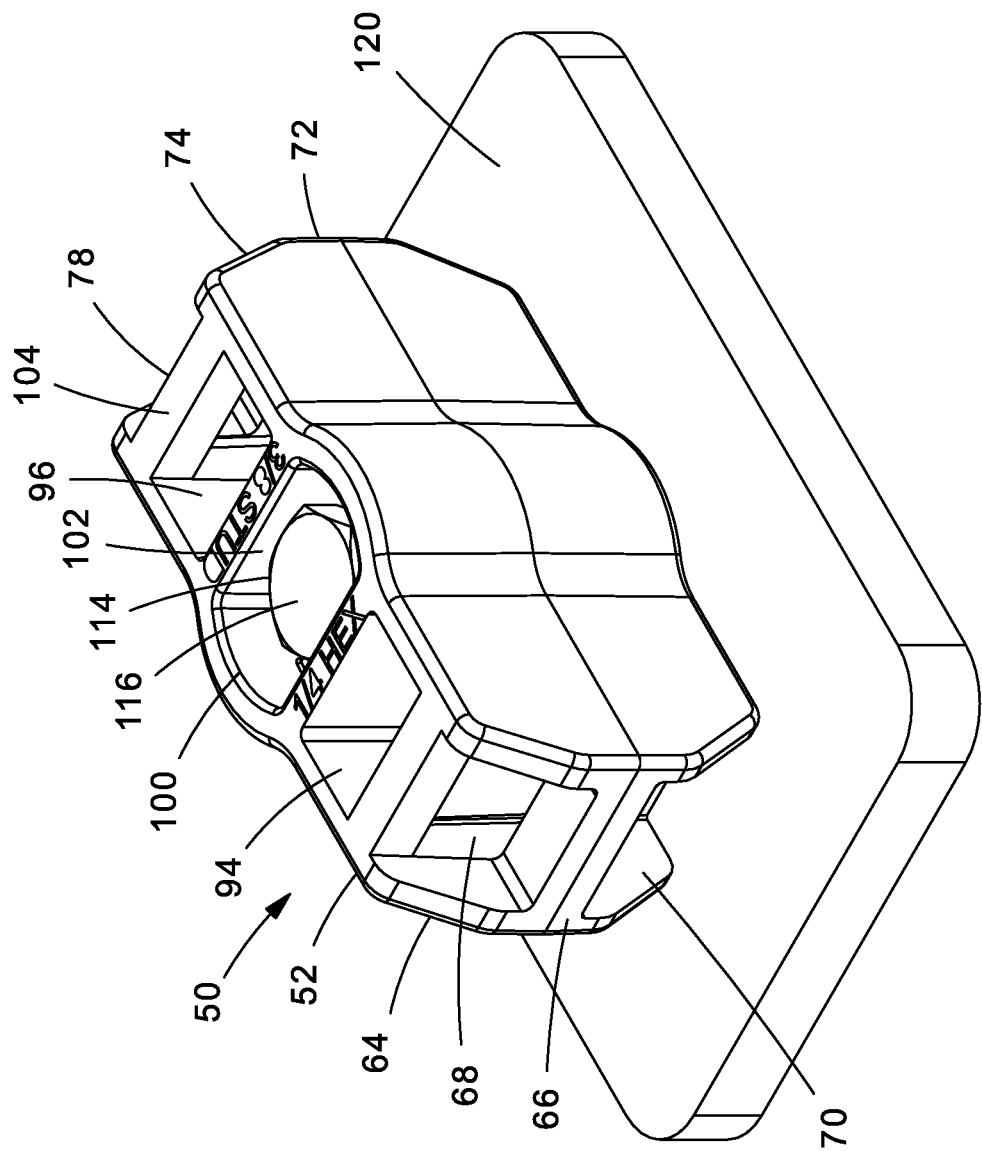
FIG. 8 is a perspective view of the cable tie mount of FIG. 7 mounted to a surface via a ¼" hex bolt.

FIGS. 7 and 8 illustrate the cable tie mount 50 and a ¼" hex bolt 114 to secure the cable tie mount 50 to a surface 120. The cable tie mount 50 is positioned on a surface 120 with the top 82 of the cable tie mount 50 engaging the surface 120 and the bottom 98 of the cable tie mount 50 positioned to receive the ¼" hex bolt 114. The ¼" hex bolt 114 is installed in the bottom center opening 100. The inner walls 102 prevent the head 116 of the ¼" hex bolt 114 from rotating so the nut 118 may be installed on the ¼" hex bolt 114 to secure the cable tie mount 50 to the surface 120.

Figure 9:
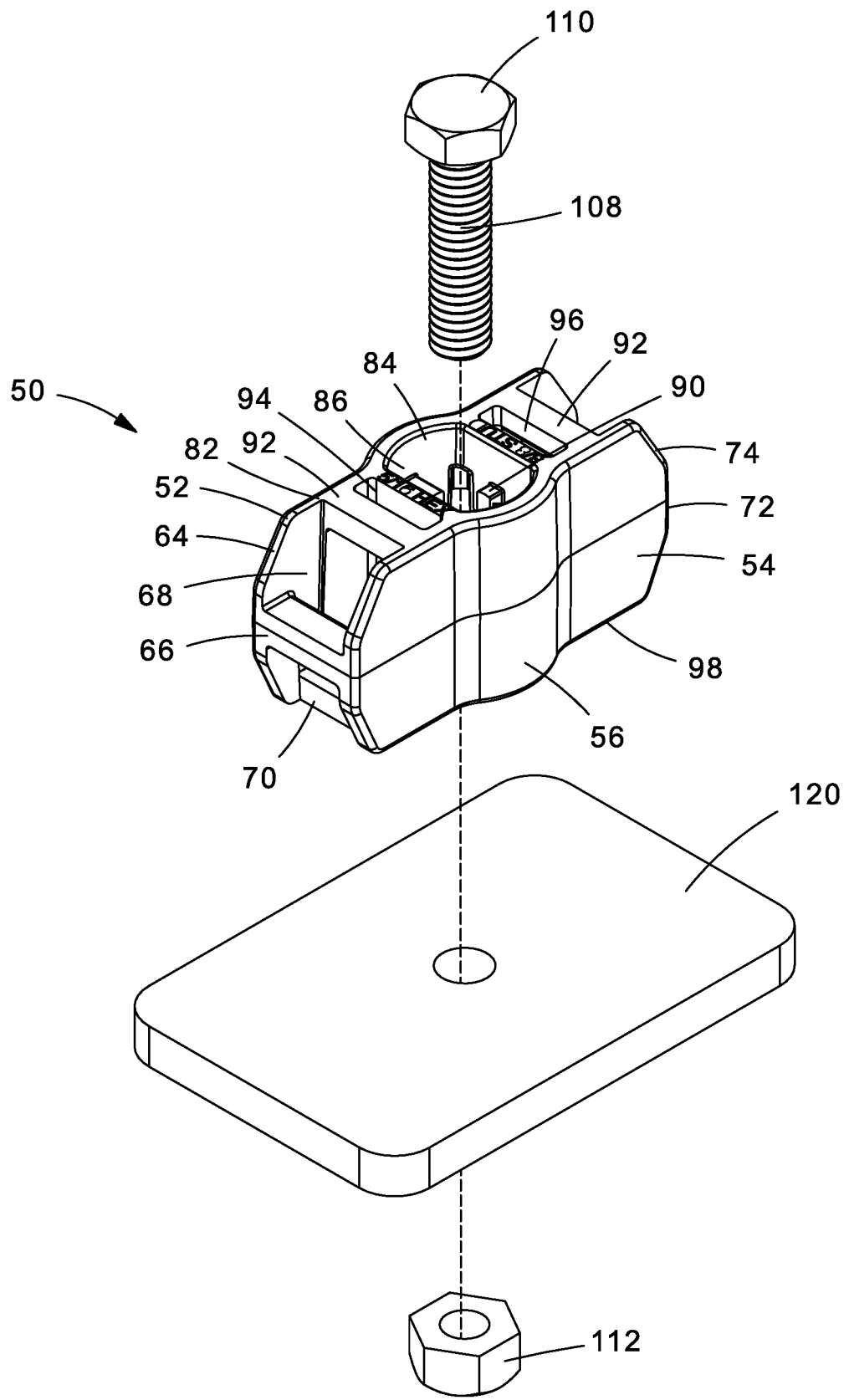
FIG. 9 is a perspective view of the cable tie mount of FIG. 1 positioned to be mounted to a surface via a 5/16" hex bolt.
Figure 10:
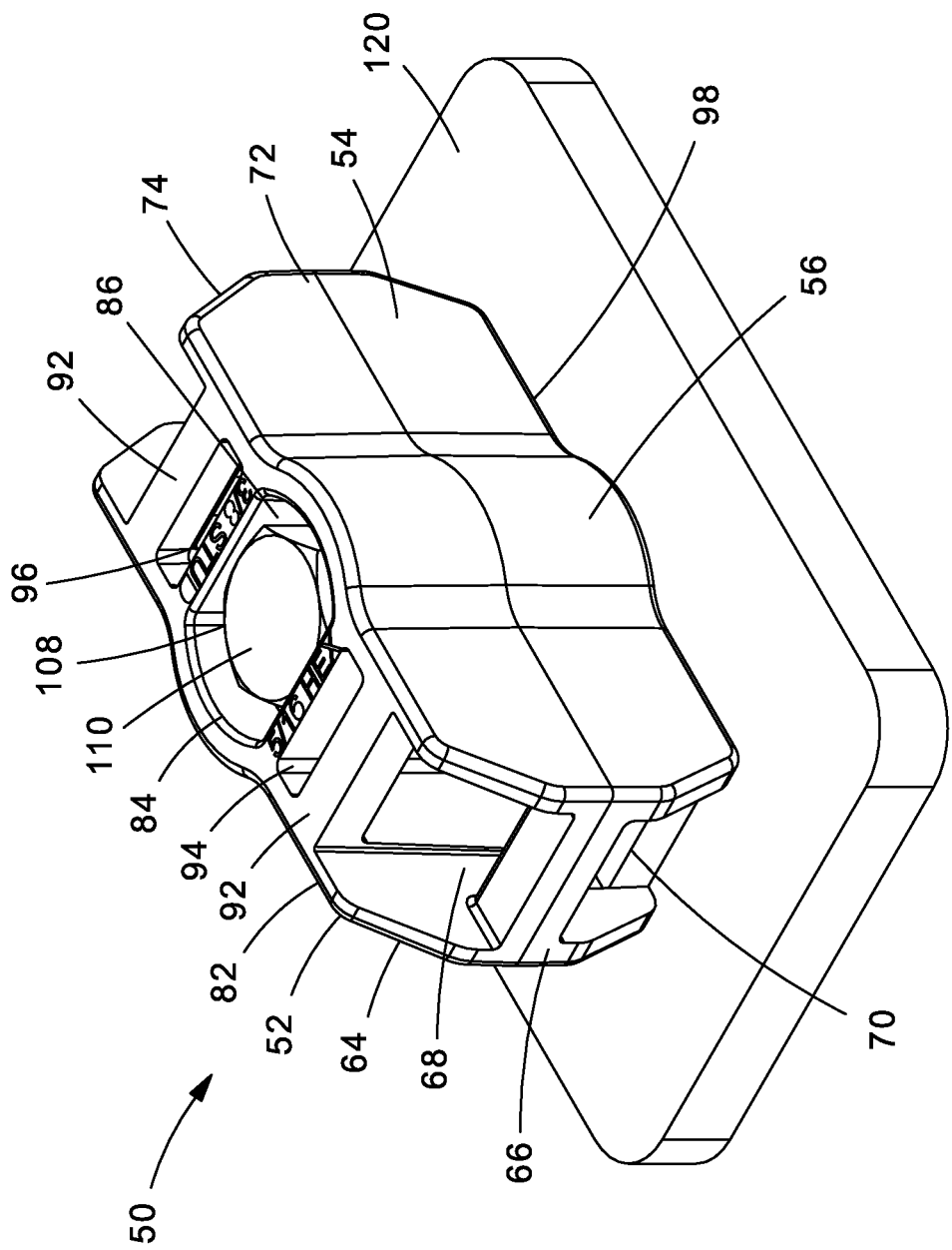
FIG. 10 is a perspective view of the cable tie mount of FIG. 9 mounted to a surface via a 5/16" hex bolt.

FIGS. 9 and 10 illustrate the cable tie mount 50 and a 5/16" hex bolt 108 to secure the cable tie mount 50 to a surface 120. The cable tie mount 50 is positioned on a surface 120 with the bottom 98 of the cable tie mount 50 engaging the surface 120 and the top 82 of the cable tie mount 50 positioned to receive the 5/16" hex bolt 108. The 5/16" hex bolt 108 is installed in the top center opening 84. The inner walls 86 prevent the head 110 of the 5/16" hex bolt 108 from rotating so the nut 112 may be installed on the 5/16" hex bolt 108 to secure the cable tie mount 50 to the surface 120.

As illustrated in FIGS. 11-16, the cable tie mount 50 allows a cable bundle 140 to be secured to the mount in multiple positions. Although FIGS. 9-14 illustrate the cable tie mount 50 secured to the surface 120 with the ⅜" stud 106, the cable tie mount 50 will also accommodate the cable bundles 140 in the same configurations when secured to the surface 120 by a 5/16" hex bolt 108 or a ¼" hex bolt 114.

Figure 11:
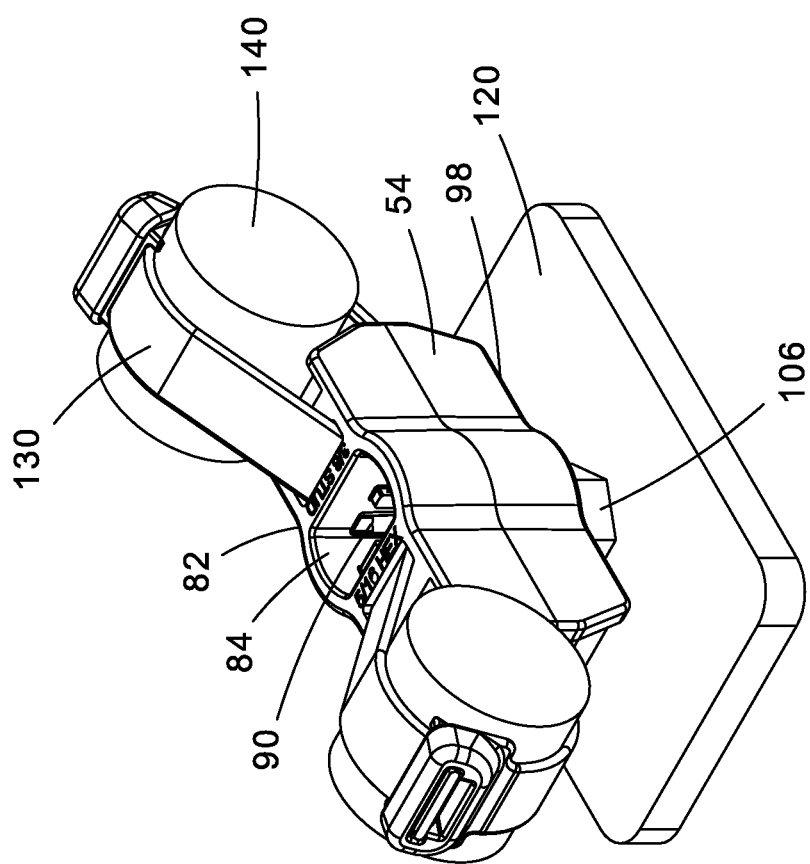
FIG. 11 is a perspective view of the cable tie mount of FIG. 1 installed on a stud with two bundles mounted to the cable tie mount.
Figure 12:
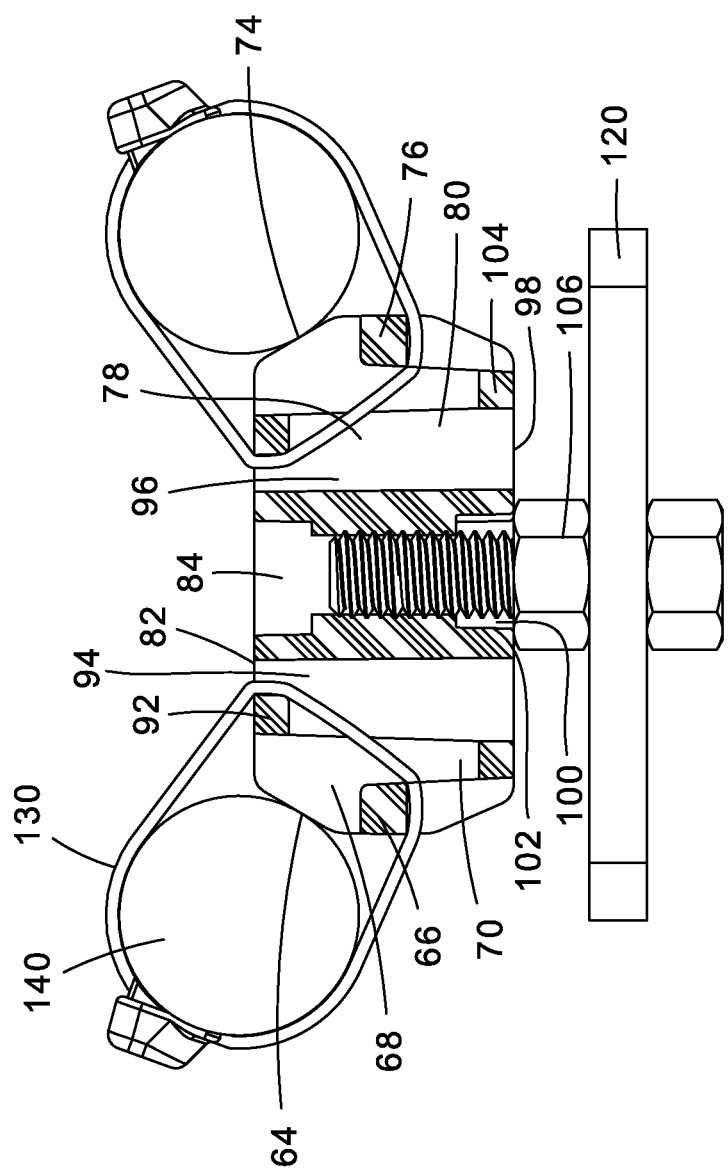
FIG. 12 is a cross sectional view of the cable tie mount of FIG. 11.

FIGS. 11 and 12 illustrate the cable tie mount 50 secured to the surface 120 via a stud 106. The cable tie mount 50 is positioned with the bottom center opening 100 receiving the stud 106. Two bundles 140 are mounted to the cable tie mount 50. The bundles 140 are positioned at an angle with respect to the first and second ends 62, 72 of the cable tie mount 50. As illustrated in FIG. 12, a first cable tie 130 or strap is feed around the top bundle retainer rib 92, around the end bundle retainer rib 66, through the first strap passageway 94, and through the fourth strap passageway 70 to secure a first bundle 140. A second cable tie 130 or strap is feed around the top bundle retainer rib 92, around the end bundle retainer rib 76, through the second strap passageway 96, and through the sixth strap passageway 80 to secure a second bundle 140.

Figure 13:
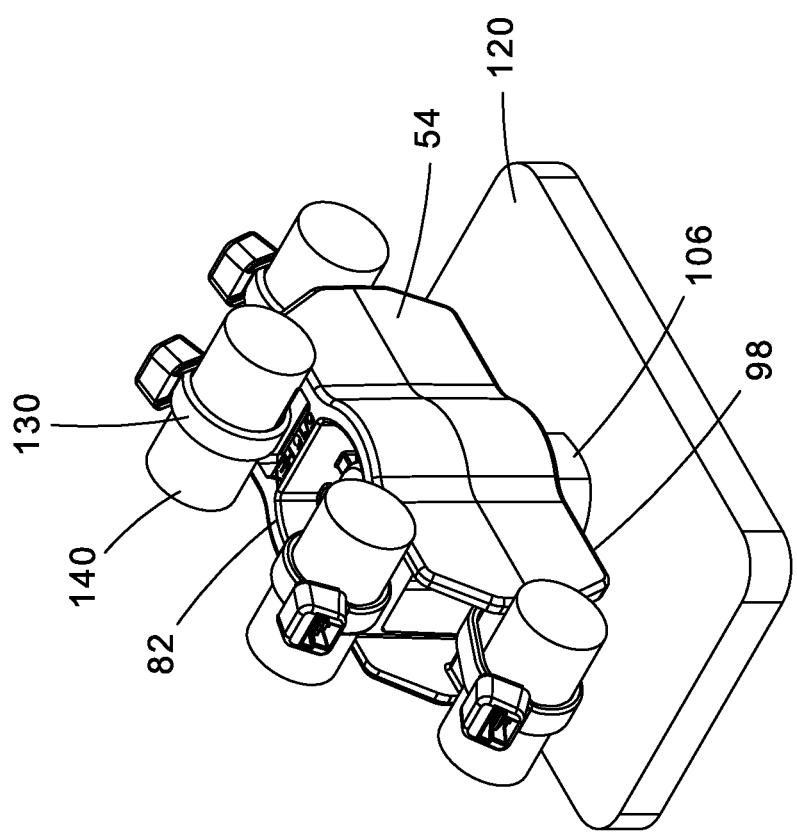
FIG. 13 is a perspective view of the cable tie mount of FIG. 1 installed on a stud with four bundles mounted to the cable tie mount.
Figure 14:
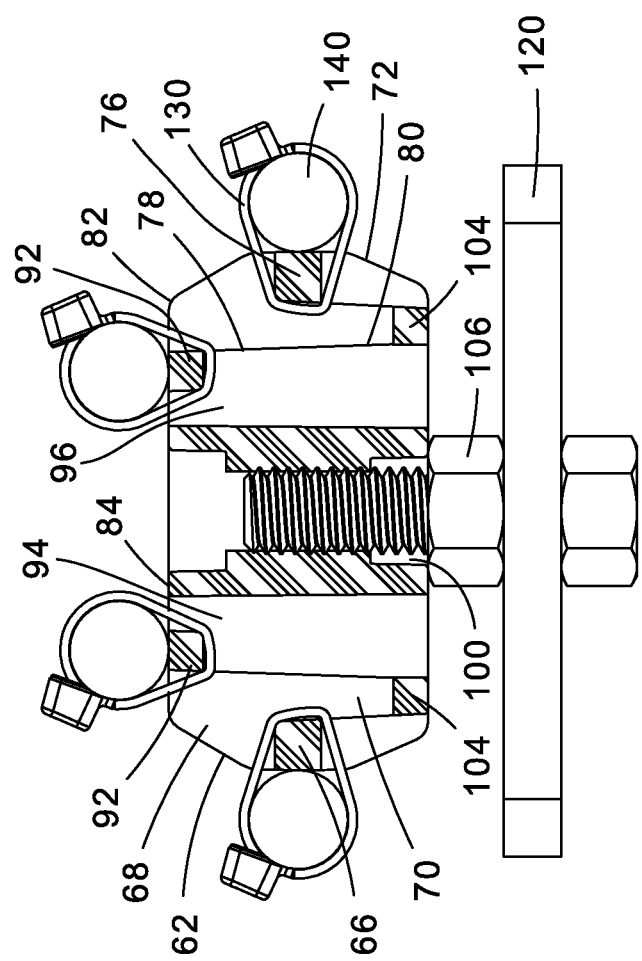
FIG. 14 is a cross sectional view of the cable tie mount of FIG. 13.

FIGS. 13-14 illustrate an alternative bundling option. The cable tie mount 50 is positioned such that the bottom center opening 100 receives the stud 106. Cable ties or straps secure four bundles of similar size to the cable tie mount 50. A first cable tie 130 or strap is fed through the third strap passageway 68 and the fourth passageway 70 to secure a bundle 140 to the end bundle retainer rib 66. A second cable tie 130 or strap is fed through the first and third strap passageways 94, 68, respectively, to secure a bundle to one of the top bundle retainer ribs 92. A third cable tie 130 or strap is fed through the second and fifth strap passageways 96, 78, respectively, to secure a bundle 140 to one of the top bundle retainer ribs 92. A fourth cable tie 130 or strap is fed through the fifth and sixth strap passageways 78, 80 to secure a bundle 140 to the end bundle retainer rib 76.

Figure 15:
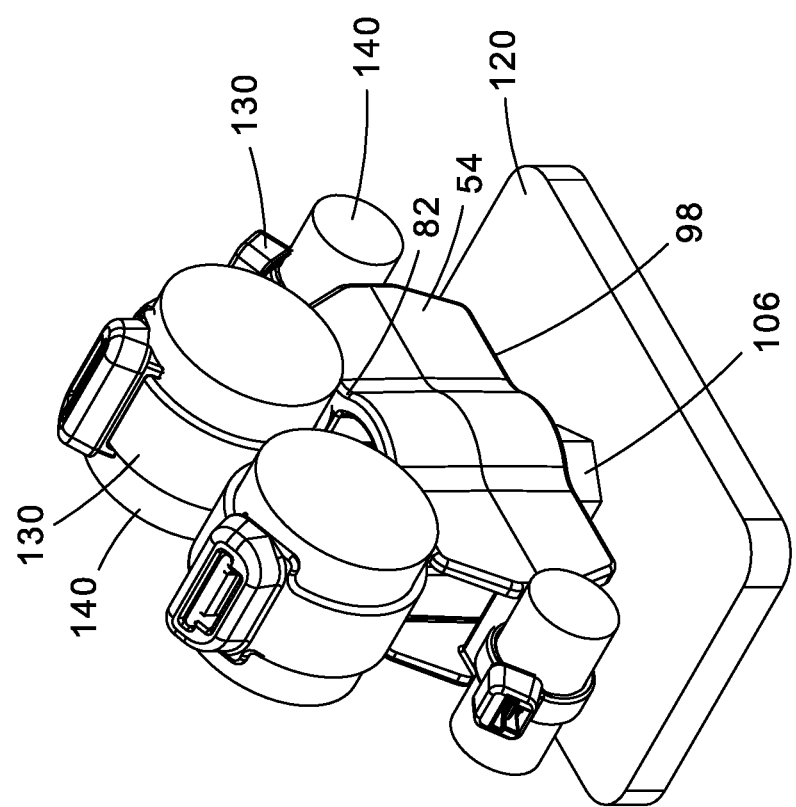
FIG. 15 is a perspective view of the cable tie mount of FIG. 1 installed on a stud with four bundles mounted to the cable tie mount.
Figure 16:
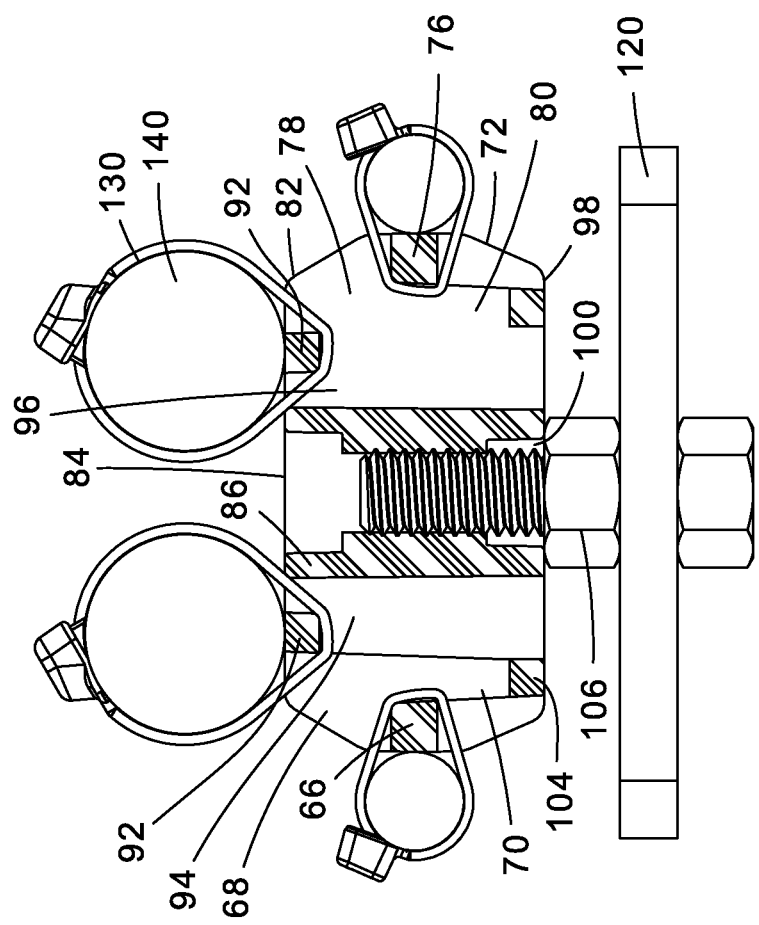
FIG. 16 is a cross sectional view of the cable tie mount of FIG. 15.

FIGS. 15-16 illustrate another alternative bundling option. The cable tie mount 50 is positioned such that the bottom center opening 100 receives a stud 106. Cable ties 130 or straps secure four bundles to the cable tie mount 50. A first cable tie 130 or strap is fed through the third and fourth passageways 68, 70, respectively to secure a bundle to the end bundle retainer rib 66. A second cable tie 130 or strap is fed through the first and third passageways 94, 68, respectively, to secure a large bundle 140 to one of the top bundle retainer ribs. A third cable tie or strap 130 is fed through the second and fifth strap passageways 96, 78 to secure a large bundle 140 to one of the top bundle retainer ribs 92. A fourth cable tie or strap 130 is fed through the fifth and sixth strap passageways 78, 80, respectively, to secure a bundle 140 to the end bundle retainer rib 76.

The cable tie mount of the present invention will be molded from different blends of Nylon 6.6 to accommodate the heavy-duty truck and transportation requirements. The cable tie mount meets the requirements for weather resistance (UV), impact and heat stabilization. It is also contemplated to use the cable tie mount with various sized studs and hex bolts, as required by the end user.

The cable tie mount of the present invention contemplates mounting various sized bundles in various positions, as desired by the end user.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A cable tie mount providing multiple mounting options and accommodating a plurality of cable bundle positions, the cable tie mount comprising:

a body having a first side, a second side, a first end, a second end, a planar top surface, a planar bottom surface opposite and parallel to the top surface, and a center hole,
  wherein the top surface includes a top center opening defined by top inner walls, and the bottom surface includes a bottom center opening defined by bottom inner walls;
  wherein the top surface includes top bundle retainer ribs, the top bundle retainer ribs and the top inner walls define a first strap passageway and a second strap passageway that runs from the top surface to the bottom surface of the cable tie mount: the bottom surface includes bottom bundle retainer ribs, the bottom bundle retainer ribs are positioned closer to the first end and the second end then the top bundle retainer ribs: the first end includes a first end bundle retainer rib, the first end bundle retainer rib and the top bundle retainer rib define a third passageway in the cable tie mount: the first end bundle retainer rib and the bottom bundle retainer rib define a fourth passageway in the cable tie mount: the second end includes a second end bundle retainer rib, the second end bundle retainer rib and the top bundle retainer rib define a fifth passageway in the cable tie mount: and the second end bundle retainer rib and the bottom bundle retainer rib define a sixth passageway in the cable tie mount: and
  wherein the center hole extends through the body from the top center opening in the top surface to the bottom center opening in the bottom surface.

2. The cable tie mount of claim 1, wherein a distance between the top inner walls is greater than a distance between the bottom inner walls, whereby the top center opening is larger than the bottom center opening.

3. The cable tie mount of claim 1, wherein the top center opening and the bottom center opening are each configured to accommodate a fastener, and wherein the top center opening receives a larger fastener than the bottom center opening.

4. The cable tie mount of claim 1, wherein the center hole is defined by a plurality of interference wedges extending into the center hole from the body for providing an interference fit when the cable tie mount is positioned on a fastener.

5. The cable tie mount of claim 4, wherein the cable tie mount is secured to a surface by the fastener with the bottom surface of the cable tie mount engaging the surface and the fastener positioned in the center hole surrounded by interference wedges.

6. The cable tie mount of claim 4, wherein the cable tie mount is secured to a surface by a fastener with the top surface of the cable tie mount engaging the surface and the fastener positioned in the center hole surrounded by interference wedges.

7. The cable tie mount of claim 1, wherein the first end and the second end are angled for enabling cable bundles to be mounted at an angle with respect to the body.

8. The cable tie mount of claim 1, wherein the top center opening retains a head of a fastener received in the cable tie mount for securing the cable tie mount to a surface, wherein the top inner walls are anti-rotation walls preventing the head of the fastener from rotating while the cable tie mount is secured.

9. The cable tie mount of claim 1, wherein the bottom center opening retains a head of a fastener received in the cable tie mount for securing the cable tie mount to a surface, wherein the bottom inner walls are anti-rotation walls preventing a head of a fastener from rotating while the cable tie mount is secured.

10. A cable tie mount capable of receiving various fasteners to secure the cable tie mount, the cable tie mount comprising:
  a body having a first side, a second side, a first end, a second end, a planar top surface, and a planar bottom surface opposite and parallel to the top surface; wherein the top surface includes top inner walls and top bundle retainer ribs, the top bundle retainer ribs and the top inner walls define a first strap passageway and a second strap passageway that runs from the top surface to the bottom surface of the cable tie mount: the bottom surface includes bottom inner walls and bottom bundle retainer ribs, the bottom bundle retainer ribs are positioned closer to the first end and the second end then the top bundle retainer ribs; the first end includes a first end bundle retainer rib, the first end bundle retainer rib and the top bundle retainer rib define a third passageway in the cable tie mount; the first end bundle retainer rib and the bottom bundle retainer rib define a fourth passageway in the cable tie mount; the second end includes a second end bundle retainer rib, the second end bundle retainer rib and the top bundle retainer rib define a fifth passageway in the cable tie mount; and the second end bundle retainer rib and the bottom bundle retainer rib define a sixth passageway in the cable tie mount;
  a center hole extending through the body, the center hole capable of receiving a first fastener;
  a top center opening in the top surface of the body, the top center opening capable of receiving a second fastener; and
  a bottom center opening in the bottom surface of the body, the bottom center opening capable of receiving a third fastener, wherein the third fastener is smaller than the second fastener,
  whereby the cable tie mount is secured to a surface by one of the first fastener, the second fastener, or the third fastener.

11. The cable tie mount of claim 10, wherein the center hole includes a plurality of interference wedges for providing an interference fit with the first fastener.

12. The cable tie mount of claim 10, wherein the top center opening includes top inner walls, wherein the top inner walls are anti-rotation walls preventing a head of the second fastener from rotating while the cable tie mount is secured.

13. The cable tie mount of claim 10, wherein the bottom center opening includes bottom inner walls, wherein the bottom inner walls are anti-rotation walls preventing a head of the third fastener from rotating while the cable tie mount is secured.

* * * * *